United States Patent
Giffin, III et al.

(10) Patent No.: US 7,246,484 B2
(45) Date of Patent: Jul. 24, 2007

(54) FLADE GAS TURBINE ENGINE WITH COUNTER-ROTATABLE FANS

(75) Inventors: Rollin George Giffin, III, Cincinnati, OH (US); James Edward Johnson, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 717 days.

(21) Appl. No.: 10/647,881

(22) Filed: Aug. 25, 2003

(65) Prior Publication Data

US 2005/0047942 A1    Mar. 3, 2005

(51) Int. Cl.
    *F02K 3/02*    (2006.01)
    *F02C 1/06*    (2006.01)
(52) U.S. Cl. .................. 60/268; 60/39.162; 60/226.3
(58) Field of Classification Search ............ 60/39.162, 60/268, 226.1, 226.3
    See application file for complete search history.

(56) References Cited

U.S. PATENT DOCUMENTS

| 3,363,419 A | 1/1968 | Wilde |
| 3,391,540 A | 7/1968 | Bauger et al. |
| 3,673,802 A * | 7/1972 | Krebs et al. ............... 60/226.1 |
| 5,261,227 A | 11/1993 | Giffin, III |
| 5,307,624 A | 5/1994 | Even-Nur et al. |
| 5,388,964 A | 2/1995 | Ciokajlo et al. |
| 5,402,638 A | 4/1995 | Johnson |
| 5,402,963 A | 4/1995 | Carey et al. |
| 5,404,713 A * | 4/1995 | Johnson ....................... 60/204 |
| 5,794,432 A | 8/1998 | Dunbar et al. |
| 5,806,303 A | 9/1998 | Johnson |
| 5,809,772 A | 9/1998 | Giffin, III et al. |
| 6,292,763 B1 | 9/2001 | Dunbar et al. |
| 6,339,927 B1 * | 1/2002 | DiPietro, Jr. ................ 60/226.1 |
| 2004/0156719 A1* | 8/2004 | Czachor ................... 415/209.4 |

FOREIGN PATENT DOCUMENTS

| EP | 0 567 277 A1 | 10/1993 |
| EP | 0 646 721 B1 | 12/1998 |

* cited by examiner

*Primary Examiner*—Charles G. Freay
(74) *Attorney, Agent, or Firm*—William Scott Andes; Steven J. Rosen

(57) ABSTRACT

An exemplary embodiment of a FLADE counter-rotating fan aircraft gas turbine engine includes at least one row of FLADE fan blades disposed radially outwardly of and drivingly connected to one of axially spaced-apart first and second counter-rotatable fans. A core engine located downstream and axially aft of the first and second counter-rotatable fans is circumscribed by a fan bypass duct downstream and axially aft of the first and second counter-rotatable fans. The row of FLADE fan blades radially extend across a FLADE duct circumscribed about the first and second counter-rotatable fans and the fan bypass duct. A second low pressure turbine is drivingly connected to the first counter-rotatable fan and a first low pressure turbine is drivingly connected to the second counter-rotatable fan.

55 Claims, 7 Drawing Sheets

FLADE GAS TURBINE ENGINE WITH COUNTER-ROTATABLE FANS

The Government has rights in this invention pursuant to Contract No. MDA972-01-3-0002 awarded by the Defense Advanced Research Projects Agency.

BACKGROUND OF THE INVENTION

1. Field of the Invention

This invention relates to FLADE aircraft gas turbine engines and, more particularly, to such engines with counter-rotatable fans.

2. Description of Related Art

High performance variable cycle gas turbine engines are being designed because of their unique ability to operate efficiently at various thrust settings and flight speeds both subsonic and supersonic. An important feature of the variable cycle gas turbine engine which contributes to its high performance is its capability of maintaining a substantially constant inlet airflow as its thrust is varied. This feature leads to important performance advantages under less than full power engine settings or maximum thrust conditions, such as during subsonic cruise. Counter-rotating fan gas turbine engines have also been designed and tested because of their unique and inherent ability to operate efficiently. Furthermore, counter-rotating fans powered by counter-rotating turbines eliminate the need for stator vanes in the fan section of the engine and at least one nozzle in the turbine section of the engine. This significantly decreases the weight of the engine. One issue regarding engine efficiency is the desirability of equalizing fan rotor torque between the counter-rotatable fans.

One particular type of variable cycle engine called a FLADE engine (FLADE being an acronym for "fan on blade") is characterized by an outer fan driven by a radially inner fan and discharging its flade air into an outer fan duct which is generally co-annular with and circumscribes an inner fan duct circumscribing the inner fan. One such engine, disclosed in U.S. Pat. No. 4,043,121, entitled "Two Spool Variable Cycle Engine", by Thomas et al., provides a flade fan and outer fan duct within which variable guide vanes control the cycle variability by controlling the amount of air passing through the flade outer fan duct. Other high performance aircraft variable cycle gas turbine FLADE engines capable of maintaining an essentially constant inlet airflow over a relatively wide range of thrust at a given set of subsonic flight ambient conditions such as altitude and flight Mach No. in order to avoid spillage drag and to do so over a range of flight conditions have been studied. This capability is particularly needed for subsonic part power engine operating conditions. Examples of these are disclosed in U.S. Pat. No. 5,404,713, entitled "Spillage Drag and Infrared Reducing Flade Engine", U.S. Pat. No. 5,402,963, entitled "Acoustically Shielded Exhaust System for High Thrust Jet Engines", U.S. Pat. No. 5,261,227, entitled "Variable Specific Thrust Turbofan Engine", and European Patent No. EP0567277, entitled "Bypass Injector Valve For Variable Cycle Aircraft Engines".

It is highly desirable to have a counter-rotating fan aircraft gas turbine engine that can modulate bypass flow from a fan section around a core engine to the bypass stream and to effectively operate at high fan hub and bypass stream pressure ratios to provide high specific thrust at takeoff and climb power settings and to operate at low bypass stream pressure ratios to provide good specific fuel consumption during reduced power cruise operation. It is also desirable to provide counter rotating fan engines to eliminate the stator vanes in the fan section of the engine, minimize the number of nozzles or vanes in the turbine, and equalize fan rotor torque between the counter-rotatable fans.

SUMMARY OF THE INVENTION

A FLADE counter-rotating fan aircraft gas turbine engine includes axially spaced-apart first and second counter-rotatable fans and at least one row of FLADE fan blades disposed radially outwardly of and drivingly connected to one of the first and second counter-rotatable fans. The first and second counter-rotatable fans are referred to being vane-less because there are no vanes between them. An exemplary embodiment of the engine further includes a second low pressure turbine drivingly connected to the first counter-rotatable fan and a first low pressure turbine drivingly connected to the second counter-rotatable fan. The first low pressure turbine and second low pressure turbine are also counter-rotatable with respect to each other in the first exemplary embodiment of the engine illustrated in FIG. 1 and are also referred to being vane-less because there are no vanes between them.

A core engine is located downstream and axially aft of the first and second counter-rotatable fans. A fan bypass duct located downstream and axially aft of the first and second counter-rotatable fans first counter-rotatable fan circumscribes the core engine. A FLADE duct circumscribes the first and second counter-rotatable fans and the fan bypass duct and across which the row of FLADE fan blades radially extend. The row of FLADE fan blades are disposed between an axially forward row of variable first FLADE vanes and an axially aft row of second FLADE vanes, which may be variable or fixed as illustrated in FIG. 1, in the FLADE duct. A front variable area bypass injector door is operatively disposed in a first bypass inlet to the fan bypass duct.

In the exemplary embodiment of the invention, the core engine includes in serial flow relationship a row of core driven fan stator vanes, a core driven fan with at least one row of core driven fan blades, a high pressure compressor, a combustor, and a high pressure turbine drivingly connected to the core driven fan. The first and second counter-rotatable fans are radially disposed across an annular first fan duct and the core driven fan is radially disposed across an annular second fan duct. A vane shroud divides the core driven fan stator vanes into radially inner and outer vane hub and tip sections. A fan shroud divides the core driven fan blades into radially inner and outer blade hub and tip sections. A first bypass inlet to the fan bypass duct is disposed axially between the second counter-rotatable fan and the annular core engine inlet to the core engine.

A fan tip duct across the vane tip sections of the core driven fan stator vanes and across the blade tip sections of the core driven fan blades extends to a second bypass inlet to the fan bypass duct. The engine further includes a first varying means for independently varying a flow area of the vane tip section and a second varying means for independently varying a flow area of the vane hub section. Particular embodiments of the first and second varying means include independently varying vane tip sections and independently varying vane hub sections, respectively. More particularly, the first and second varying means may include an inner shaft attached to a pivotable trailing edge hub flap of the vane hub section and an outer shaft attached to a pivotable trailing edge tip flap of the vane tip section. The inner shaft is coaxially disposed within an outer shaft of the fan stator vane. A first unison ring is connected in actuating relationship to a first lever arm which is connected in rotatably actuating relationship to the inner shaft. A second unison ring is connected in actuating relationship to a second lever arm which is connected in rotatably actuating relationship to the outer shaft.

A plurality of circumferentially disposed hollow struts in fluid communication with and operable to receive air from the FLADE duct structurally support and flow air to a substantially hollow centerbody. A variable area flade air nozzle includes an axially translatable plug within the hollow centerbody and a radially outwardly positioned fixed nozzle cowling of the centerbody. A variable throat area engine nozzle downstream and axially aft of the counter-rotatable second low pressure turbine and the fan bypass duct includes a radially fixed axially translatable outer annular convergent and divergent wall and a radially and axially fixed annular inner wall on the centerbody.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
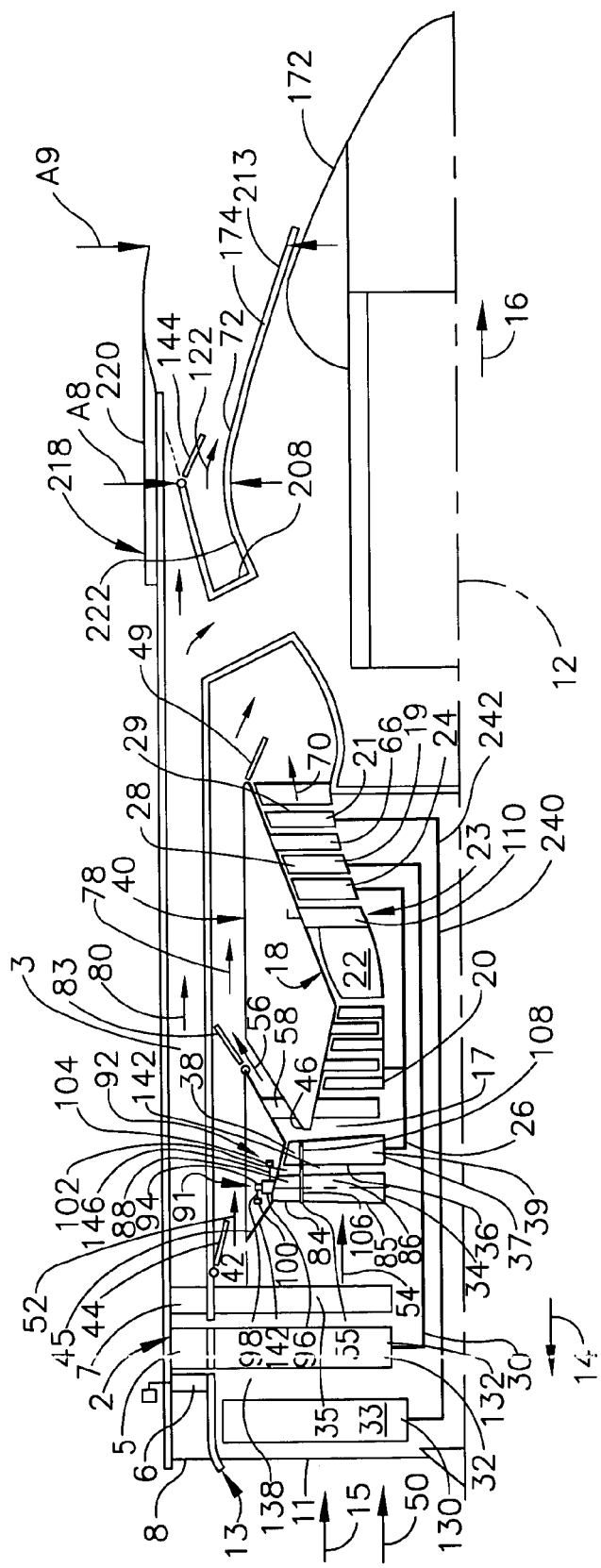
FIG. 1 is a schematical cross-sectional view illustration of a first exemplary embodiment of a FLADE aircraft gas turbine engine with counter-rotatable fans.
Figure 2:
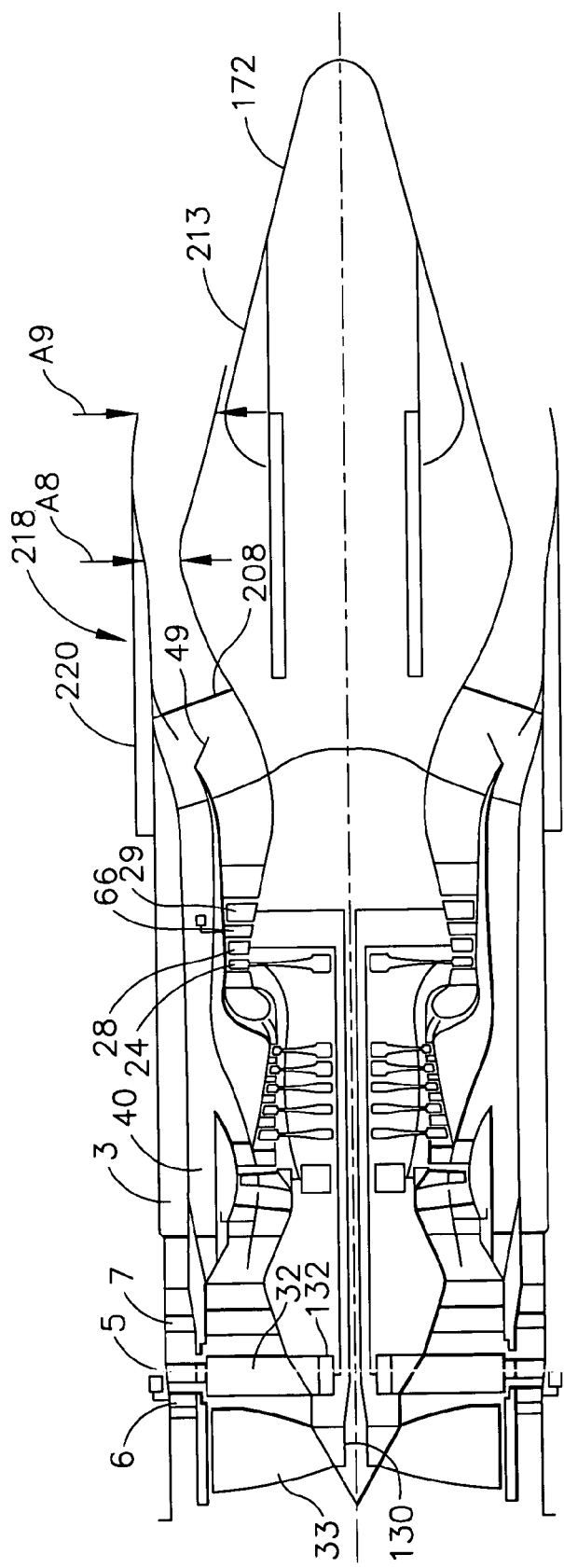
FIG. 2 is a schematical cross-sectional view illustration of a second exemplary embodiment of a FLADE aircraft gas turbine engine with counter-rotatable first and second fans and variable exhaust nozzle with translating nozzle cowl arranged for high power operation.
Figure 3:
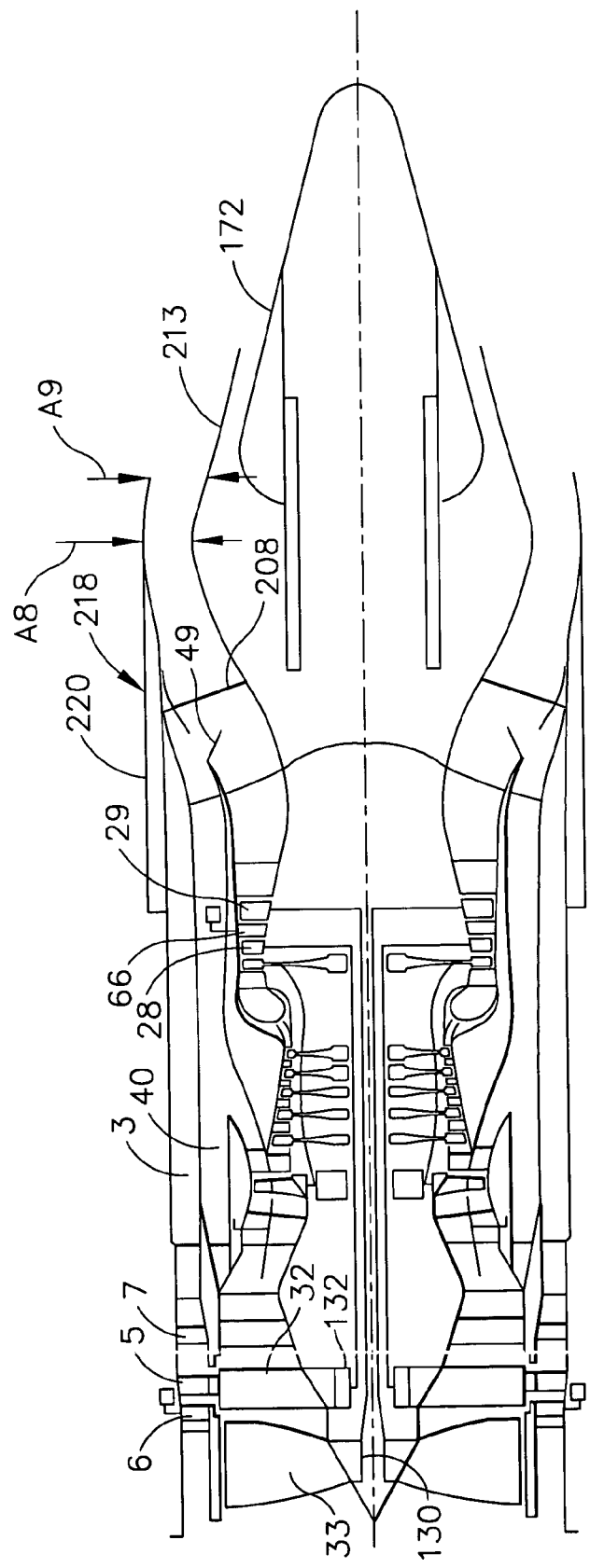
FIG. 3 is a schematical cross-sectional view illustration of the engine in FIG. 2 arranged for low power operation.

Illustrated in FIGS. 1–3 is a FLADE counter-rotatable fan aircraft gas turbine engine 1 having a fan inlet 11 leading to first and second counter-rotatable fans 130 and 132. A FLADE fan 2 having at least one row of FLADE fan blades 5 disposed in a FLADE duct 3 through which FLADE airflow 80 is exhausted by the FLADE fan blades 5. The row of FLADE fan blades 5 is disposed radially outward of, operably connected to, and driven by one of the first or second counter-rotatable fans 130 and 132. In FIG. 1, the second fan 132 is illustrated as the FLADE fan having a row of FLADE fan blades 5 disposed between an axially forward row of variable first FLADE vanes 6 and an axially aft row of fixed second FLADE vanes 7. The FLADE fan 2 is disposed downstream of an annular FLADE inlet 8 to the FLADE duct 3. The FLADE inlet 8 and the fan inlet 11 in combination generally form a FLADE engine inlet 13 having a FLADE engine inlet area AI. Downstream and axially aft of the first and second counter-rotatable fans 130 and 132 is a core engine 18 having an annular core engine inlet 17 and a generally axially extending axis or centerline 12 generally extending forward 14 and aft 16. A fan bypass duct 40 located downstream and axially aft of the first and second counter-rotatable fans 130 and 132 circumscribes the core engine 18. The FLADE duct 3 circumscribes the first and second counter-rotatable fans 130 and 132 and the fan bypass duct 40.

One important criterion of inlet performance discussed is the ram recovery factor. A good inlet must have air-handling characteristics which are matched with the engine, as well as low drag and good flow stability. The importance of the air-flow matching characteristics can be shown from the area considerations of FIG. 1, which for the FLADE engine inlet 13 includes a free stream flow area A0 and the FLADE engine inlet area AI through which the total engine airflow passes. For a given set of operating flight conditions, the airflow requirements are fixed by the pumping characteristics of the FLADE engine 1. During supersonic operation of the engine, if AI is too small to handle the inlet airflow the inlet shock moves downstream of the inlet throat and pressure recovery across the shock worsens and the exit corrected flow from the inlet increases to satisfy the engine demand. If AI is too large, the FLADE engine inlet 13 will supply more air than the engine can use resulting in excess drag (spillage drag), because we must either by-pass the excess air around the engine or "spill" it back out of the inlet. Too much air or too little air is detrimental to aircraft system performance. The FLADE fan 2 and the FLADE duct 3 are designed and operated to help manage the inlet airflow delivered by the inlet to the fans.

The fan inlet 11 is sized to receive essentially full engine airflow 15 of the engine at full power conditions with the FLADE engine inlet 13 essentially closed off by closing the variable first FLADE vanes 6 and the variable second FLADE vanes 7 as illustrated in FIG. 3. The engine is further designed and operated to fully open the inlet of the flade duct at predetermined part power flight conditions as illustrated in FIG. 2 and essentially close it at full power conditions such as take-off as illustrated in FIG. 3.

The core engine 18 includes, in downstream serial axial flow relationship, a core driven fan 37 having a row of core driven fan blades 36, a high pressure compressor 20, a combustor 22, and a high pressure turbine 23 having a row of high pressure turbine blades 24. A high pressure shaft 26, disposed coaxially about the centerline 12 of the engine 1, fixedly interconnects the high pressure compressor 20 and the high pressure turbine blades 24. The core engine 18 is effective for generating combustion gases. Pressurized air from the high pressure compressor 20 is mixed with fuel in the combustor 22 and ignited, thereby, generating combustion gases. Some work is extracted from these gases by the high pressure turbine blades 24 which drives the core driven fan 37 and the high pressure compressor 20. The high pressure shaft 26 rotates the core driven fan 37 having a single row of circumferentially spaced apart core driven fan blades 36 having generally radially outwardly located blade tip sections 38 separated from generally radially inwardly located blade hub sections 39 by an annular fan shroud 108.

The combustion gases are discharged from the core engine 18 into counter-rotatable first and second low pressure turbines 19 and 21 having first and second rows of low pressure turbine blades 28 and 29, respectively. The second low pressure turbine 21 is drivingly connected to the first counter-rotatable fan 130 by a first low pressure shaft 30, the combination or assembly being designated a first low pressure spool 240. The first low pressure turbine 19 is drivingly connected to the second counter-rotatable fan 132 by a second low pressure shaft 31, the combination or assembly being designated a second low pressure spool 242. The second counter-rotatable fan 132 has a single row of generally radially outwardly extending and circumferentially spaced-apart second fan blades 32. The first counter-rotatable fan 130 has a single row of generally radially outwardly extending and circumferentially spaced-apart first fan blades 33. The FLADE fan blades 5 are primarily used to flexibly match inlet airflow requirements.

Figure 4:
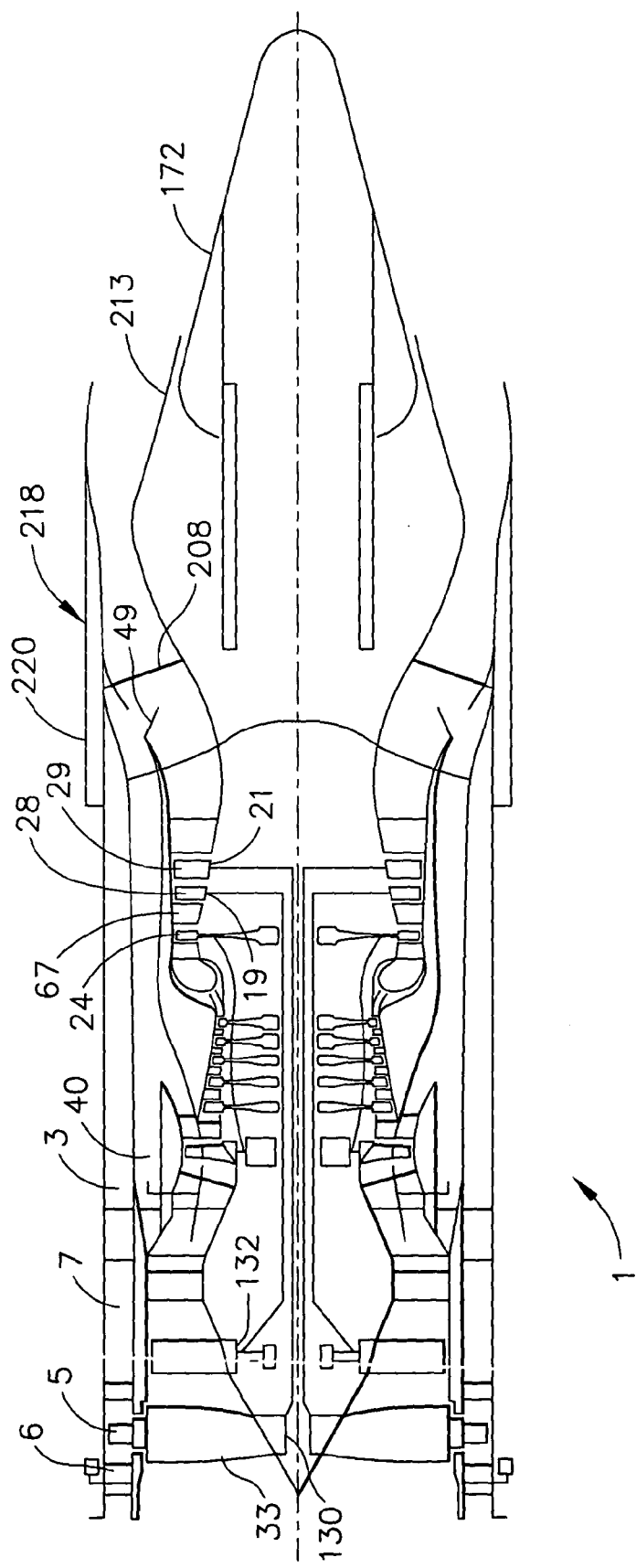
FIG. 4 is a schematical cross-sectional view illustration of a third exemplary embodiment of a FLADE aircraft gas turbine engine with the first fan having a row of FLADE fan blades and a row of fixed vanes between a high pressure turbine and a first low pressure turbine.
Figure 6:
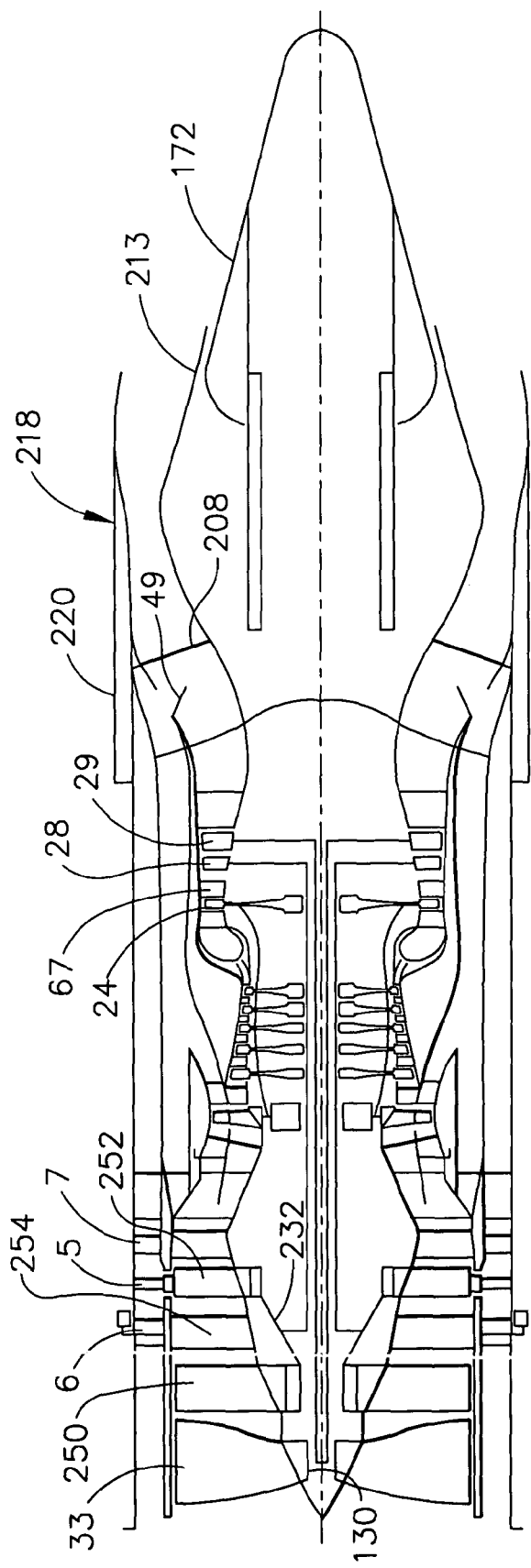
FIG. 6 is a schematical cross-sectional view illustration of a fifth exemplary embodiment of a FLADE aircraft gas turbine engine with a second fan stage of the second fan having the row of FLADE fan blades and a row of fixed vanes between the high pressure turbine and the first low pressure turbine.
Figure 7:
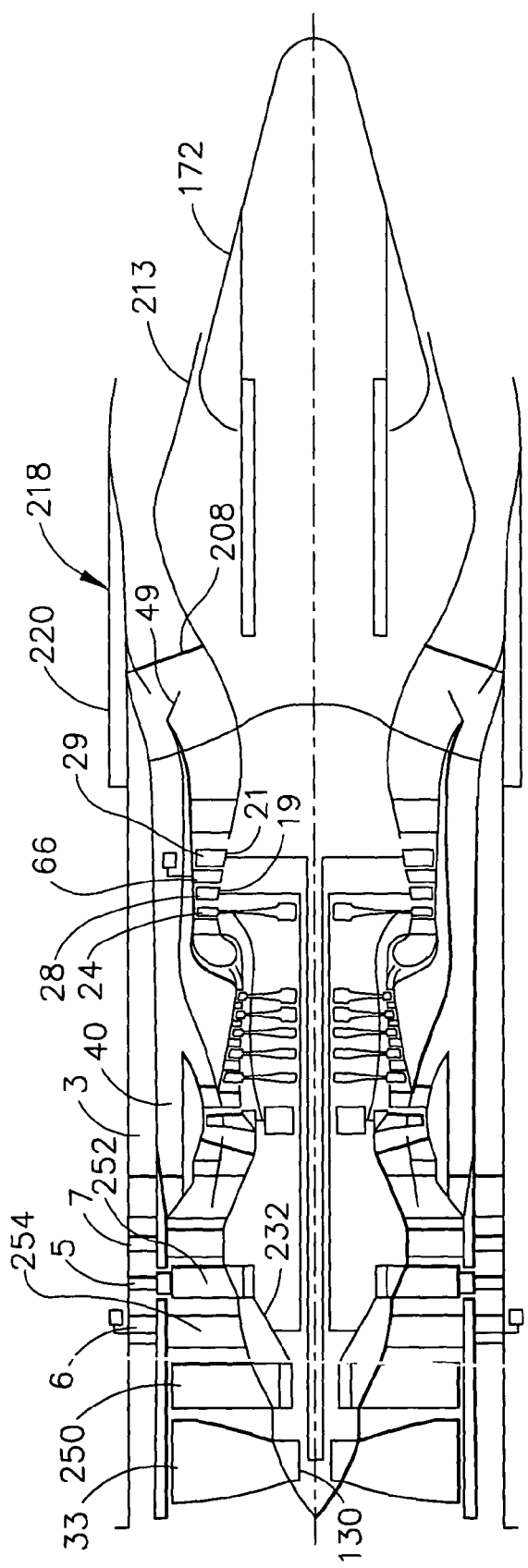
FIG. 7 is a schematical cross-sectional view illustration of a sixth exemplary embodiment of a FLADE aircraft gas turbine engine with the second fan stage of the second fan having the row of FLADE fan blades and a row of variable vanes between counter-rotatable first and second low pressure turbines.

In one embodiment of the engine 1, the row of FLADE fan blades 5 disposed in the FLADE duct 3 are mounted to and extend radially outwardly from the row of second fan blades 32 of the second counter-rotatable fan 132, as illustrated in FIGS. 1–3. In another embodiment of the engine 1, the row of FLADE fan blades 5 disposed in the FLADE duct 3 are attached to and extend radially outwardly from the row of first fan blades 33 of the first counter-rotatable fan 130, as illustrated in FIG. 4. In yet another embodiment of the engine 1, the row of FLADE fan blades 5 disposed in the FLADE duct 3 are attached to and extend radially outwardly from a row of second stage blades 252 of a two stage second counter-rotatable fan 232, as illustrated in FIGS. 6 and 7.

Referring to FIGS. 1 and 2, a first bypass inlet 42 to the fan bypass duct 40 is disposed axially between the second counter-rotatable fan 132 and the annular core engine inlet 17 to the core engine 18, thereby, providing two coaxial bypass flowpaths into the fan bypass duct from the first and second counter-rotatable fans 130 and 132. The first fan blades 33 of the first counter-rotatable fan 130 and the second fan blades 32 of the second counter-rotatable fan 132 are radially disposed across the first fan duct 138. A row of circumferentially spaced-apart first fan stator vanes 35 is radially disposed across the first fan duct 138, downstream of the first and second counter-rotatable fan 130 and 132, and axially between the second counter-rotatable fan 132 and the first bypass inlet 42 to the fan bypass duct 40. The first fan duct 138 contains the first and second counter-rotatable fans 130 and 132 including the first and second fan blades 33 and 32 and the row of circumferentially spaced-apart first fan stator vanes 35. The first fan stator vanes 35 may not be needed. The row of the core driven fan blades 36 of the core driven fan 37 are radially disposed across an annular second fan duct 142. The second fan duct 142 begins axially aft of the first bypass inlet 42 and is disposed radially inwardly of the fan bypass duct 40. An annular first flow splitter 45 is radially disposed between the first bypass inlet 42 and the second fan duct 142.

The full engine airflow 15 is split between the FLADE inlet 8 and the fan inlet 11. A fan airflow 50 passes through the fan inlet 11 and then the first and second counter-rotatable fans 130 and 132. A first bypass air portion 52 of the fan airflow 50 passes through the first bypass inlet 42 of the fan bypass duct 40 when a front variable area bypass injector (VABI) door 44 in the first bypass inlet 42 is open and with the remaining air portion 54 passing through the core driven fan 37 and its row of core driven fan blades 36.

A row of circumferentially spaced-apart core driven fan stator vanes 34 within the second fan duct 142 are disposed axially between the row of second fan blades 32 and the core driven fan blades 36 of the core driven fan 37. The row of the core driven fan stator vanes 34 and the core driven fan blades 36 of the core driven fan 37 are radially disposed across the second fan duct 142. A vane shroud 106 divides the core driven fan stator vanes 34 into radially inner and outer vane hub and tip sections 85 and 84, respectively. The fan shroud 108 divides the core driven fan blades 36 into the radially inner and outer blade hub and tip sections 39 and 38, respectively.

A second bypass airflow portion 56 is directed through a fan tip duct 146 across the vane tip sections 84 of the core driven fan stator vanes 34 and across the blade tip sections 38 of the core driven fan blades 36 into a second bypass inlet 46 of a second bypass duct 58 to the fan bypass duct 40. An optional middle variable area bypass injector (VABI) door 83 may be disposed at an aft end of the second bypass duct 58 for modulating flow through the second bypass inlet 46 to the fan bypass duct 40. An aft variable area bypass injector (VABI) door 49 is disposed at an aft end of the fan bypass duct 40 to mix bypass air 78 with core discharge air 70. The aft VABI doors 49 in FIGS. 2–7 are circumferentially disposed between hollow struts 208 which structurally support and flow air to a hollow engine nozzle centerbody 72 and thus are illustrated out of plane in these FIGS.

The fan tip duct 146 includes the vane and fan shrouds 106 and 108 and a second flow splitter 55 at a forward end of the vane shroud 106. First and second varying means 91 and 92 are provided for independently varying flow areas of the vane hub and tip sections 85 and 84, respectively. Exemplary first and second varying means 91 and 92 include independently variable vane hub and tip sections 85 and 84, respectively (see U.S. Pat. No. 5,806,303). The independently variable vane hub and tip sections 85 and 84 designs may include having the entire vane hub and tip sections 85 and 84 be independently pivotable. Other possible designs are disclosed in U.S. Pat. Nos. 5,809,772 and 5,988,890.

Another embodiment of the independently variable vane hub and tip sections 85 and 84 includes pivotable trailing-edge hub and tip flaps 86 and 88 of the independently variable vane hub and tip sections 85 and 84 as illustrated in FIG. 1. The first and second varying means 91 and 92 can include independently pivoting flaps. Alternative varying means for non-pivotable, fan stator vane designs include axially moving unison rings and those means known for mechanical clearance control in jet engines (i.e., mechanically moving circumferentially surrounding shroud segments radially towards and away from a row of rotor blade tips to maintain a constant clearance despite different rates of thermal expansion and contraction). Additional such varying means for non-pivotable, fan stator vane designs include those known for extending and retracting wing flaps on airplanes and the like.

Exemplary first and second varying means 91 and 92, illustrated in FIG. 1, include an inner shaft 94 coaxially disposed within an outer shaft 96. The inner shaft 94 is rotated by a first lever arm 98 actuated by a first unison ring 100. The outer shaft 96 is rotated by a second lever arm 102 actuated by a second unison ring 104. The inner shaft 94 is attached to the pivotable trailing edge hub flap 86 of the vane hub section 85 of the fan stator vane 34. The outer shaft 96 is attached to the pivotable trailing edge tip flap 88 of the vane tip section 84 of the fan stator vane 34. It is noted that the lever arms 98 and 102 and the unison rings 100 and 104 are all disposed radially outward of the fan stator vanes 34.

Other such pivoting means include those known for pivoting variable stator vanes of high pressure compressors in jet engines, and the like.

The row of FLADE fan blades 5 is disposed radially outward of, operably connected to, and driven by one of the first or second counter-rotatable fans 130 and 132. The embodiments of the engine 1 illustrated in FIGS. 1–3, have the FLADE fan blades 5 connected to, and driven by one of the second counter-rotatable fan 132. The axially forward row of variable first FLADE vanes 6 are used to control the amount of a FLADE airflow 80 allowed into the FLADE inlet 8 and the FLADE duct 3. Opening and closing of the FLADE duct 3 by opening and closing the first FLADE vanes 6 at part power thrust setting of the engine 1 allows the engine to maintain an essentially constant inlet airflow over a relatively wide range of thrust at a given set of subsonic flight ambient conditions such as altitude and flight Mach No. and also avoid spillage drag and to do so over a range of flight conditions. This capability is particularly needed for subsonic part power engine operating conditions. The vanes are essentially closed at a predetermined full power thrust setting of the engine. Furthermore, the FLADE inlet annular area is sized to be a fraction of an annular fan inlet area of the fan inlet 11 so that it is sufficient to receive a predetermined maximum amount of spillage air spilled from fan inlet 11. Note that additional rows of FLADE fan blades and corresponding variable FLADE vanes are also contemplated by the present invention.

The high pressure turbine 23 includes a row of high pressure turbine (HPT) nozzle stator vanes 110 which directs flow from the combustor 22 to the row of high pressure turbine blades 24. Flow from the row of high pressure turbine blades 24 is then directed into counter-rotatable second and first low pressure turbines 21 and 19 and second and first rows of low pressure turbine blades 29 and 28, respectively. The exemplary embodiments of the engine 1 illustrated in FIGS. 1–3, includes a row of low pressure stator vanes 66 between the second and first rows of low pressure turbine blades 29 and 28. The exemplary embodiment of the engine 1 illustrated in FIG. 1 incorporates a row of fixed low pressure stator vanes 66 between the second and first rows of low pressure turbine blades 29 and 28. The exemplary embodiment of the engine 1 illustrated in FIGS. 2 and 3 incorporates a row of variable low pressure stator vanes 66 between the second and first rows of low pressure turbine blades 29 and 28. The first low pressure turbine 19 and its first row of low pressure turbine blades 28 are counter-rotatable with respect to the row of high pressure turbine blades 24. The first low pressure turbine 19 and its first row of low pressure turbine blades 28 are counter-rotatable with respect to the second low pressure turbine 21 and its second row of low pressure turbine blades 29.

A variable throat area engine nozzle 218 is downstream and axially aft of the counter-rotatable second low pressure turbine 21 and the fan bypass duct 40. The engine nozzle 218 includes an axially translatable radially outer annular convergent and divergent wall 220 spaced radially outwardly apart from a radially fixed and axially translatable annular inner wall 222 on the centerbody 72. The translatable radially outer annular convergent and divergent wall 220 controls a throat area A8 between the outer annular convergent/divergent wall 220 and the radially fixed and axially translatable annular inner wall 222. The translatable radially outer annular convergent/divergent wall 220 also controls a nozzle exit area A9 of the engine nozzle 218. Alternatively, a variable throat area convergent/divergent nozzle with flaps may be used as disclosed in U.S. Pat. No. 5,404,713.

The plurality of circumferentially disposed hollow struts 208 are in fluid communication with and operable to receive air from the FLADE duct 3. The hollow struts 208 structurally support and flow air to the centerbody 72 which is substantially hollow. A variable area flade air nozzle 213 includes an axially translatable plug 172 which cooperates with a radially outwardly positioned fixed nozzle cowling 174 of the centerbody 72 to exhaust FLADE airflow 80 received from the hollow struts 208 to return work to the engine in the form of thrust. Optionally, a second portion of FLADE airflow 80 may be injected into the exhaust flow 122 through an aft FLADE variable area bypass injector door 144.

A major goal of counter rotating fan engines is to eliminate the stator vanes in the fan section of the engine. A second goal is to minimize the number of nozzles or vanes in the turbine. The savings in weight and cost due to the removal of the fan stator vanes is traded against the complexity of adding a third spool, namely one of the first and second counter rotating low pressure spools. Counter rotating fan engines typically have a wheel speed of the second counter-rotatable fan 132 that is somewhat lower than that of the first counter-rotatable fan 130. This is one reason for selecting the second counter-rotatable fan 132 upon which to mount the row of FLADE fan blades 5. An elevated relative Mach number into second counter-rotatable fan 132 is the reason for its lower wheel speed and it is a result of the counter-swirl imparted by the first counter-rotatable fan 130. The lower wheel speed of the second counter-rotatable fan 132 suggests a reduced work fraction on it to equalize the net fan rotor torque. In this manner, the exit swirl from the second counter-rotatable fan 132 is sufficiently small so no downstream straightening vanes are required. One exemplary speed ratio of the second counter-rotatable fan 132 to the first counter-rotatable fan 130, (speed of rotor 2/speed of rotor 1), is 0.75 which is also the work ratio of the two fans. The resulting work split is 57.5% for the first counter-rotatable fan 130 and the remaining 42.5% for the second counter-rotatable fan 132. Current studies suggest that energy requirements of the row of FLADE fan blades 5 is in a range of 15 to 30 percent of the overall fan energy.

One problem with counter-rotatable fans is an area ratio requirement across the first low pressure turbine 19. Prudent design practice suggests little or no outward slope over the turbine rotor to lessen turbine blade tip clearance migrations with the axial migration of the turbine rotor. Design practice also constrains turbine blade hub slope to less that about 30 degrees to avoid excessive aerodynamic loss in this region. It is desirable to avoid first low pressure turbines having rotor pressure ratios in excess of about 1.45. Turbines rotor pressure ratio is defined turbine blade inlet pressure divided by turbine blade exit pressure. Prior counter-rotatable fan engine designs indicate that first low pressure turbines have pressure ratios of about 1.9. This is far more than what is desirable.

The total work on the second low pressure spool 242 is the sum of the work performed by the second counter-rotatable fan 132 plus the work performed by the FLADE fan blades 5. The total work extracted by the first low pressure turbine 19, which is drivingly connected to the second counter-rotatable fan 132, requires a first low pressure turbine 19 pressure ratio well in excess of the above noted limit for a no turbine nozzle configuration. A solution to this problem is to reduce the work requirement of the second counter-rotatable fan 132 to a point consistent with a first low pressure turbine 19 pressure ratio of about 1.45. The reduced work of the second counter-rotatable fan 132 is then added to the work required by first counter-rotatable fan 130, thereby restoring the total fan work. Adequate fan stall margin must be retained with the revised stage pressure ratio requirements. Rotor speeds of the first and second counter-rotatable fans 130 and 132 are determined by their respective pressure ratio requirements. The rotor speed of the second counter-rotatable fan 132 is determined by its pressure ratio requirement or alternatively by the pressure ratio requirement of the FLADE fan blades 5. The resulting work ratio for the second counter-rotatable fan 132 in the engine illustrated in FIGS. 1–3 is about 0.43 and its speed ratio is about 0.73.

The flade airflow 80 may be modulated using the variable first FLADE vanes 6 to provide maximum engine airflow capability at take-off operating conditions for noise abatement or for engine-inlet airflow matching during flight. At supersonic cruise conditions the flade airflow may be reduced to its least energy absorbing airflow to permit the highest attainable specific thrust. The flade airflow modulation may alter the work requirement of the first low pressure turbine 19 of the second low pressure spool 242. However, the first low pressure turbine 19 and its first row of low pressure turbine blades 28 is nested between the row of high pressure turbine blades 24 of the high pressure turbine 23 and the second low pressure turbine 21 and its second row of low pressure turbine blades 29. The first low pressure turbine 19 inlet flow function is expected to remain relatively constant over its steady state operating space. The second low pressure turbine 21 inlet flow function is also expected to remain relatively constant over its steady state operating regime. Accordingly, the pressure ratio of the first low pressure turbine 19 is expected to remain relatively constant. At constant pressure ratio the work output of the first low pressure turbine 19 will remain relatively constant. This constant work output of the first low pressure turbine 19 coupled with the reduced work input requirement of the first low pressure spool 240, due to closure of the variable first FLADE vanes 6 and the row of FLADE fan blades 5 would create a torque imbalance and cause an acceleration of the low pressure spool 240. The pressure ratio across the first low pressure turbine 19 must be modulated to prevent this excess torque. The modulation is accomplished by varying the row of variable low pressure stator vanes 66 between the first and second rows of low pressure turbine blades 28 and 29 to adjust inlet flow to the second row of low pressure turbine blades 29. A variable throat area A8 helps to avoid over extraction by the second low pressure turbine 21.

Illustrated in FIG. 4 is an exemplary second alternative FLADE counter-rotatable fan aircraft gas turbine engine 1 having the FLADE fan blades 5 mounted to the first fan blades 33 of the first counter-rotatable fan 130. A row of fixed stator vanes 67 are disposed between the row of high pressure turbine blades 24 and the first row of low pressure turbine blades 28. There are no vanes, fixed or variable, between the second and first rows of low pressure turbine blades 29 and 28 of the counter-rotatable second and first low pressure turbines 21 and 19, respectively.

Mounting the FLADE fan blades 5 to the first fan blades 33 of the first counter-rotatable fan 130 can eliminate the requirement for the variable low pressure stator vanes 66 between the first and second rows of low pressure turbine blades 28 and 29 to adjust inlet flow to the second row of low pressure turbine blades 29. The modulating energy requirement of the FLADE fan blades 5 is removed from the second low pressure spool 242 and placed on the first low pressure spool 240. With this design, the changing operating flow-pressure ratio requirement can be totally accommodated by the variable throat area engine nozzle 218. The variable throat area nozzle is required for normal engine operation. Thus, this embodiment of the engine takes advantage of a feature that is already required. The arrangement illustrated in FIG. 4 depicts a vaned first low pressure turbine 19 having a row of vanes directly upstream of the first low pressure turbine 19 and a vane-less second low pressure turbine 21 not having a row of vanes directly upstream of the second low pressure turbine 21. An additional alternative arrangement might be a vane-less first low pressure turbine 19 and a vane-less second low pressure turbine 21. Rotor pressure ratio tailoring may be desirable for such a configuration.

Mounting the FLADE fan blades 5 to the first fan blades 33 of the first counter-rotatable fan 130 requires a redefinition of the fans to adjust a first fan inlet radius ratio of the first counter-rotatable fan 130 and the work split between the first and second counter-rotatable fans 130 and 132. The first fan inlet radius ratio needs to be adjusted to a larger value such that when the FLADE fan blades 5 are taken into account the overall fan radius ratio of the first low pressure spool 240 does not become less than about 0.3. This adjustment is to retain mechanical integrity. With removal of the flade from the second low pressure spool, the pressure ratio of its fan rotor can be increased until the pressure ratio of the first low pressure turbine 19 approaches and reaches its 1.45 limit for a vaneless counter-rotatable low pressure turbine configuration, i.e no vanes between the counter-rotatable low pressure turbines. The pressure ratio of the second counter-rotatable fan 132 can be reduced accordingly to retain the overall design fan pressure ratio.

The tip speed of the first counter-rotatable fan 130 is reduced from its level in FIG. 2 because its pressure ratio requirement has been reduced. However, with the FLADE fan blades 5 protruding outward from the first counter-rotatable fan 130, the tip speed of the FLADE fan blades may rise to an unacceptable level. The design of such blades to sustain bird strikes is very difficult at best. The high tip speed is not a requirement of the FLADE fan blades 5. Indeed, the pressure ratio of the FLADE fan blades 5 requirement is probably modest for such a tip speed. The reduction in tip speed of the first counter-rotatable fan 130 requires a reduction in its pressure ratio requirement. This, in turn, requires an increase in the pressure ratio requirement of the second counter-rotatable fan 132. The pressure ratio of the second counter-rotatable fan 132 is set by the area ratio, (i.e. pressure ratio), constraint of the no nozzle first low pressure turbine 19 configuration.

Figure 5:
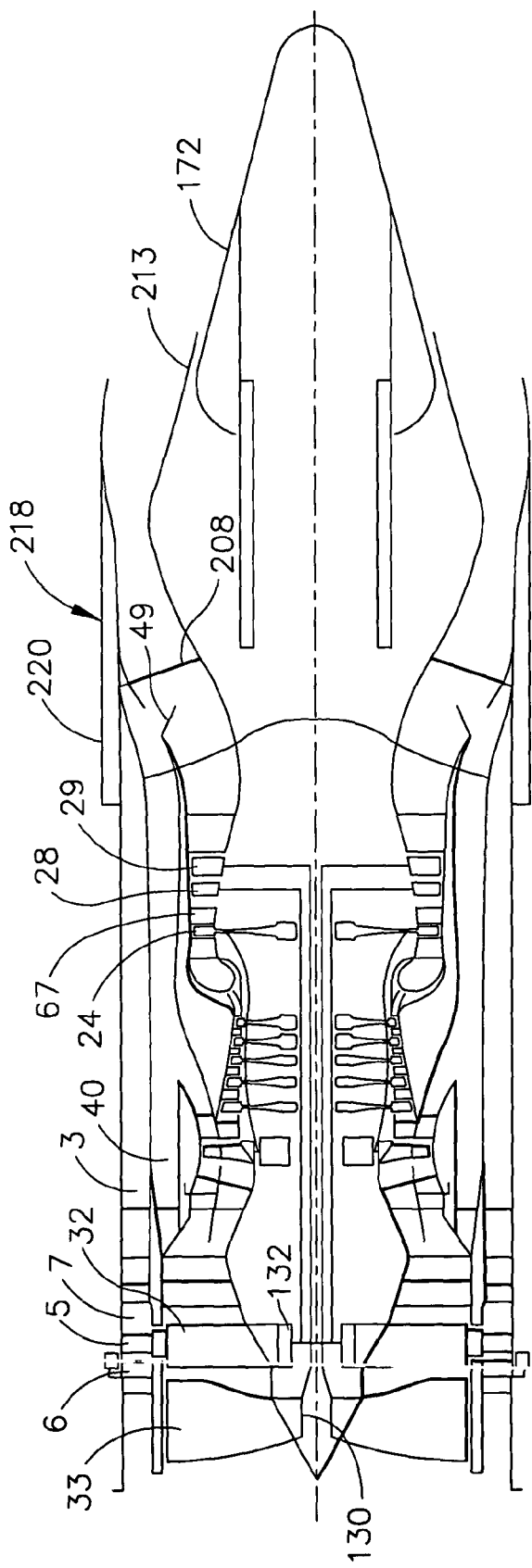
FIG. 5 is a schematical cross-sectional view illustration of a fourth exemplary embodiment of a FLADE aircraft gas turbine engine with the second fan having the row of FLADE fan blades and a row of fixed vanes between the high pressure turbine and the first low pressure turbine.

Illustrated in FIG. 5 is an exemplary third alternative FLADE counter-rotatable fan aircraft gas turbine engine 1 having the FLADE fan blades 5 mounted to and extend radially outwardly from the row of second fan blades 32 of the second counter-rotatable fan 132. A row of fixed stator vanes 67 are disposed between the row of high pressure turbine blades 24 and the first row of low pressure turbine blades 28. There are no vanes, fixed or variable, between the second and first rows of low pressure turbine blades 29 and 28 of the counter-rotatable second and first low pressure turbines 21 and 19, respectively.

Illustrated in FIG. 6 is an exemplary fourth alternative FLADE counter-rotatable fan aircraft gas turbine engine 1 in which the second counter-rotatable fan 132 has two axially spaced apart stages or rows of fan blades designated as rows of first and second stage blades 250 and 252, respectively, and a row of second stage fan vanes 254 therebetween. The FLADE fan blades 5 are mounted to and extend radially outwardly from the second stage blades 252 of the second counter-rotatable fan 132. A row of fixed stator vanes 67 are disposed between the row of high pressure turbine blades 24 and the first row of low pressure turbine blades 28. There are no vanes, fixed or variable, between the second and first rows of low pressure turbine blades 29 and 28 of the counter-rotatable second and first low pressure turbines 21 and 19, respectively.

Illustrated in FIG. 7 is an exemplary fifth alternative FLADE counter-rotatable fan aircraft gas turbine engine 1 in which the second counter-rotatable fan 132 has the two stages or rows of fan blades designated as the first and second stage blades 250 and 252, respectively. The FLADE fan blades 5 mounted to and extend radially outwardly from the row of second fan blades 32 of the second counter-rotatable fan 132. A row of variable low pressure stator vanes 66 are axially disposed between the second and first rows of low pressure turbine blades 29 and 28. There are no vanes, fixed or variable, between the row of high pressure turbine blades 24 and the first row of low pressure turbine blades 28.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed is:

1. A FLADE counter-rotating fan aircraft gas turbine engine comprising:
   axially spaced-apart first and second counter-rotatable fans,
   at least one row of FLADE fan blades disposed radially outwardly of and drivingly connected to one of the first and second counter-rotatable fans, and
   a variable throat area engine nozzle downstream and axially aft of a counter-rotatable second low pressure turbine drivingly connected to the first counter-rotatable fan.

2. An engine as claimed in claim 1 further comprising a first low pressure turbine drivingly connected to the second counter-rotatable fan.

3. An engine as claimed in claim 1 further comprising:
   a core engine located downstream and axially aft of the first and second counter-rotatable fans,
   a fan bypass duct located downstream and axially aft of the first and second counter-rotatable fans and circumscribing the core engine, and
   the row of FLADE fan blades radially extend across a FLADE duct circumscribing the first and second counter-rotatable fans and the fan bypass duct.

4. An engine as claimed in claim 3 further comprising the row of FLADE fan blades disposed between an axially forward row of variable first FLADE vanes and an axially aft row of second FLADE vanes in the FLADE duct.

5. An engine as claimed in claim 3 further comprising a first low pressure turbine drivingly connected to the second counter-rotatable fan and a second low pressure turbine drivingly connected to the first counter-rotatable fan.

6. An engine as claimed in claim 2 further comprising:
   a core engine located downstream and axially aft of the first and second counter-rotatable fans,
   the core engine having in serial flow relationship a row of core driven fan stator vanes, a core driven fan with at least one row of core driven fan blades, a high pressure compressor, a combustor, and a high pressure turbine drivingly connected to the core driven fan,
   first and second counter-rotatable fans are radially disposed across an annular first fan duct,
   the core driven fan is radially disposed across an annular second fan duct,
   a vane shroud dividing the core driven fan stator vanes into radially inner and outer vane hub and tip sections,
   a fan shroud dividing the core driven fan blades into radially inner and outer blade hub and tip sections,
   a first bypass inlet to the fan bypass duct is disposed axially between the second counter-rotatable fan and the annular core engine inlet to the core engine,
   a fan tip duct across the vane tip sections of the core driven fan stator vanes and across the blade tip sections of the core driven fan blades extending to a second bypass inlet to the fan bypass duct, and
   a first varying means for independently varying a flow area of the vane tip section.

7. An engine as claimed in claim 6 further a second varying means for independently varying a flow area of the vane hub section.

8. An engine as claimed in claim 7 wherein the first and second varying means include independently varying vane tip sections and independently varying vane hub sections respectively.

9. An engine as claimed in claim 8 further comprising a front variable area bypass injector door in the first bypass inlet.

10. An engine as claimed in claim 9 further comprising the first and second varying means including:
    an inner shaft attached to a pivotable trailing edge hub flap of the vane hub section,
    an outer shaft attached to a pivotable trailing edge tip flap of the vane tip section,
    the inner shaft coaxially disposed within an outer shaft of the fan stator vane,
    a first unison ring connected in actuating relationship to a first lever arm which is connected in rotatably actuating relationship to the inner shaft, and
    a second unison ring connected in actuating relationship to a second lever arm which is connected in rotatably actuating relationship to the outer shaft.

11. An engine as claimed in claim 6 further comprising:
    a plurality of circumferentially disposed hollow struts in fluid flow communication with the FLADE duct,
    a substantially hollow centerbody supported by and in fluid flow communication with the hollow struts, and
    a variable area flade air nozzle including an axially translatable plug within the hollow centerbody and a radially outwardly positioned fixed nozzle cowling of the centerbody.

12. An engine as claimed in claim 6 further comprising:
    the high pressure turbine having a row of high pressure turbine nozzle stator vanes axially located between the combustor and a row of high pressure turbine blades of the high pressure turbine,
    the row of high pressure turbine blades being counter-rotatable to the first low pressure turbine,
    a row of fixed stator vanes between the row of high pressure turbine blades and the first low pressure turbine,
    no vanes between the first and second rows of low pressure turbine blades of the first and second low pressure turbines respectively, and
    the row of high pressure turbine nozzle stator vanes, the row of high pressure turbine blades, the row of fixed stator vanes, the first row of low pressure turbine blades, and the second row of low pressure turbine blades being in serial axial and downstream relationship.

13. An engine as claimed in claim 12 further comprising a second varying means for independently varying a flow area of the vane hub section.

14. An engine as claimed in claim 13 wherein the first and second varying means include independently varying vane tip sections and independently varying vane hub sections respectively.

15. An engine as claimed in claim 14 further comprising a front variable area bypass injector door in the first bypass inlet.

16. An engine as claimed in claim 6 further comprising:
the second counter-rotatable fan having axially spaced apart rows of first and second stage blades and a row of second stage fan vanes therebetween,
the row of FLADE fan blades disposed radially outwardly of and drivingly connected to the row of second stage blades,
the high pressure turbine having a row of high pressure turbine nozzle stator vanes axially located between the combustor and a row of high pressure turbine blades of the high pressure turbine,
the row of high pressure turbine blades being counter-rotatable to the first low pressure turbine,
a row of fixed stator vanes between the row of high pressure turbine blades and the first low pressure turbine,
no vanes between the first and second rows of low pressure turbine blades of the first and second low pressure turbines respectively, and
the row of high pressure turbine nozzle stator vanes, the row of high pressure turbine blades, the row of fixed stator vanes, the first row of low pressure turbine blades, and the second row of low pressure turbine blades being in serial axial and downstream relationship.

17. An engine as claimed in claim 16 further comprising a second varying means for independently varying a flow area of the vane hub section.

18. An engine as claimed in claim 17 wherein the first and second varying means include independently varying vane tip sections and independently varying vane hub sections respectively.

19. An engine as claimed in claim 18 further comprising a front variable area bypass injector door in the first bypass inlet.

20. An engine as claimed in claim 19 further comprising the first and second varying means including:
an inner shaft attached to a pivotable trailing edge hub flap of the vane hub section,
an outer shaft attached to a pivotable trailing edge tip flap of the vane tip section,
the inner shaft coaxially disposed within an outer shaft of the fan stator vane,
a first unison ring connected in actuating relationship to a first lever arm which is connected to rotatably actuating relationship to the inner shaft, and
a second unison ring connected in actuating relationship to a second lever arm which is connected in rotatably actuating relationship to the outer shaft.

21. An engine as claimed in claim 6 further comprising:
the second counter-rotatable fan having axially spaced apart rows of first and second stage blades and a row of second stage fan vanes therebetween,
the row of FLADE fan blades disposed radially outwardly of and drivingly connected to the row of second stage blades,
the high pressure turbine having a row of high pressure turbine nozzle stator vanes axially located between the combustor and a row of high pressure turbine blades of the high pressure turbine,
the row of high pressure turbine blades being counter-rotatable to the first low pressure turbine,
a row of variable low pressure stator vanes between first and second rows of low pressure turbine blades of the first and second low pressure turbines respectively, and
the row of high pressure turbine nozzle stator vanes, the row of high pressure turbine blades, the first row of low pressure turbine blades, the row of variable low pressure stator vanes, and the second row of low pressure turbine blades being in serial axial and downstream relationship.

22. An engine as claimed in claim 21 further comprising a second varying means for independently varying a flow area of the vane hub section.

23. An engine as claimed in claim 22 wherein the first and second varying means include independently varying vane tip sections and independently varying vane hub sections respectively.

24. An engine as claimed in claim 23 further comprising a front variable area bypass injector door in the first bypass inlet.

25. An engine as claimed in claim 24 further comprising the first and second varying means including:
an inner shaft attached to a pivotable trailing edge hub flap of the vane hub section,
an outer shaft attached to a pivotable trailing edge tip flap of the vane tip section,
the inner shaft coaxially disposed within an outer shaft of the fan stator vane,
a first unison ring connected in actuating relationship to a first lever arm which is connected in rotatably actuating relationship to the inner shaft, and
a second unison ring connected in actuating relationship to a second lever arm which is connected in rotatably actuating relationship to the outer shaft.

26. An engine as claimed in claim 6 further comprising:
a plurality of circumferentially disposed hollow struts in fluid flow communication with the FLADE duct,
a substantially hollow centerbody supported by and in fluid flow communication with the hollow struts,
a variable area flade air nozzle including an axially translatable plug within the hollow centerbody and a radially outwardly positioned fixed nozzle cowling of the centerbody,
the variable throat area engine nozzle downstream and axially aft of the fan bypass duct,
the second counter-rotatable fan having axially spaced apart rows of first and second stage blades and a row of second stage fan vanes therebetween, and
the row of FLADE fan blades disposed radially outwardly of and drivingly connected to the row of second stage blades.

27. An engine as claimed in claim 26 further comprising:
the high pressure turbine having a row of high pressure turbine nozzle stator vanes axially located between the combustor and a row of high pressure turbine blades of the high pressure turbine,
the row of high pressure turbine blades being counter-rotatable to the first low pressure turbine, a row of fixed stator vanes between the row of high pressure turbine blades and the first low pressure turbine, no vanes between the first and second rows of low pressure turbine blades of the first and second low pressure turbines respectively, and the row of high pressure turbine nozzle stator vanes, the row of high pressure turbine blades, the row of fixed stator vanes, the first row of low pressure turbine blades, and the second row of low pressure turbine blades being in serial axial and downstream relationship.

28. An engine as claimed in claim 27 further comprising a second varying means for independently varying a flow area of the vane hub section.

29. An engine as claimed in claim 28 wherein the first and second varying means include independently varying vane tip sections and independently varying vane hub sections respectively.

30. An engine as claimed in claim 29 further comprising a front variable area bypass injector door in the first bypass inlet.

31. An engine as claimed in claim 30 further comprising the first and second varying means including:

an inner shaft attached to a pivotable trailing edge hub flap of the vane hub section, an outer shaft attached to a pivotable trailing edge tip flap of the vane tip section, the inner shaft coaxially disposed within an outer shaft of the fan stator vane, a first unison ring connected in actuating relationship to a first lever arm which is connected in rotatably actuating relationship to the inner shaft, and a second unison ring connected in actuating relationship to a second lever arm which is connected in rotatably actuating relationship to the outer shaft.

32. An engine as claimed in claim 26 further comprising:

the high pressure turbine having a row of high pressure turbine nozzle stator vanes axially located between the combustor and a row of high pressure turbine blades of the high pressure turbine, the row of high pressure turbine blades being counter-rotatable to the first low pressure turbine, a row of variable low pressure stator vanes between first and second rows of low pressure turbine blades of the first and second low pressure turbines respectively, and the row of high pressure turbine nozzle stator vanes, the row of high pressure turbine blades, the first row of low pressure turbine blades, the row of variable low pressure stator vanes, and the second row of low pressure turbine blades being in serial axial and downstream relationship.

33. An engine as claimed in claim 32 further comprising a second varying means for independently varying a flow area of the vane hub section.

34. An engine as claimed in claim 33 wherein the first and second varying means include independently varying vane tip sections and independently varying vane hub sections respectively.

35. An engine as claimed in claim 34 further comprising a front variable area bypass injector door in the first bypass inlet.

36. An engine as claimed in claim 35 further comprising the first and second varying means including:

an inner shaft attached to a pivotable trailing edge hub flap of the vane hub section, an outer shaft attached to a pivotable trailing edge tip flap of the vane tip section, the inner shaft coaxially disposed within an outer shaft of the fan stator vane, a first unison ring connected in actuating relationship to a first lever arm which is connected in rotatably actuating relationship to the inner shaft, and a second unison ring connected in actuating relationship to a second lever arm which is connected in rotatably actuating relationship to the outer shaft.

37. An engine as claimed in claim 26 further comprising the variable throat area engine nozzle including an axially translatable radially outer annular convergent and divergent wall and a radially fixed and axially translatable annular inner wall on the centerbody.

38. An engine as claimed in claim 37 further comprising:

the variable throat area engine nozzle having an axially translatable radially outer annular convergent/divergent wall spaced radially outwardly apart from a radially fixed and axially translatable annular inner wall on the centerbody, the translatable radially outer annular convergent/divergent wall operable to control a throat area between the convergent/divergent wall and the radially fixed and axially translatable annular inner wall, and the translatable radially outer annular convergent/divergent wall operable to control a nozzle exit area of the engine nozzle.

39. An engine as claimed in claim 2 further comprising the row of FLADE fan blades disposed radially outwardly of and drivingly connected to the first counter-rotatable fan.

40. An engine as claimed in claim 39 further comprising:

the high pressure turbine having a row of high pressure turbine nozzle stator vanes axially located between the combustor and a row of high pressure turbine blades of the high pressure turbine, the row of high pressure turbine blades being counter-rotatable to the first low pressure turbine, a row of variable low pressure stator vanes between first and second rows of low pressure turbine blades of the first and second low pressure turbines respectively, and the row of high pressure turbine nozzle stator vanes, the row of high pressure turbine blades, the first row of low pressure turbine blades, the row of variable low pressure stator vanes, and the second row of low pressure turbine blades being in serial axial and downstream relationship.

41. An engine as claimed in claim 39 further comprising:

a core engine located downstream and axially aft of the first and second counter-rotatable fans, a fan bypass duct located downstream and axially aft of the first and second counter-rotatable fans and circumscribing the core engine, and the row of FLADE fan blades radially extend across a FLADE duct circumscribing the first and second counter-rotatable fans and the fan bypass duct.

42. An engine as claimed in claim 41 further comprising the row of FLADE fan blades disposed between an axially forward row of variable first FLADE vanes and an axially aft row of second FLADE vanes in the FLADE duct.

43. An engine as claimed in claim 42 further comprising a first low pressure turbine drivingly connected to the second counter-rotatable fan and a second low pressure turbine drivingly connected to the first counter-rotatable fan.

44. An engine as claimed in claim 43 further comprising:

the core engine having in serial flow relationship a row of core driven fan stator vanes, a core driven fan with at least one row of core driven fan blades, a high pressure compressor, a combustor, and a high pressure turbine drivingly connected to the core driven fan, first and second counter-rotatable fans are radially disposed across an annular first fan duct, the core driven fan is radially disposed across an annular second fan duct, a vane shroud dividing the core driven fan stator vanes into radially inner and outer vane hub and tip sections, a fan shroud dividing the core driven fan blades into radially inner and outer blade hub and tip sections, a first bypass inlet to the fan bypass duct is disposed axially between the second counter-rotatable fan and the annular core engine inlet to the core engine, a fan tip duct across the vane tip sections of the core driven fan stator vanes and across the blade tip sections of the core driven fan blades extending to a second bypass inlet to the fan bypass duct, and a first varying means for independently varying a flow area of the vane tip section.

45. A FLADE counter-rotating fan aircraft gas turbine engine comprising:

axially spaced-apart first and second counter-rotatable fans and at least one row of FLADE fan blades disposed radially outwardly of and drivingly connected to one of the first and second counter-rotatable fans, a second low pressure turbine drivingly connected to the first counter-rotatable fan and a first low pressure turbine drivingly connected to the second counter-rotatable fan, a core engine located downstream and axially aft of the first and second counter-rotatable fans, the core engine having in serial flow relationship a row of core driven fan stator vanes, a core driven fan with at least one row of core driven fan blades, a high pressure compressor, a combustor, and a high pressure turbine drivingly connected to the core driven fan, first and second counter-rotatable fans are radially disposed across an annular first fan duct, the core driven fan is radially disposed across an annular second fan duct, a vane shroud dividing the core driven fan stator vanes into radially inner and outer vane hub and tip sections, a fan shroud dividing the core driven fan blades into radially inner and outer blade hub and tip sections, a first bypass inlet to the fan bypass duct is disposed axially between the second counter-rotatable fan and the annular core engine inlet to the core engine, a fan tip duct across the vane tip sections of the core driven fan stator vanes and across the blade tip sections of the core driven fan blades extending to a second bypass inlet to the fan bypass duct, a first varying means for independently varying a flow area of the vane tip section, the row of FLADE fan blades disposed radially outwardly of and drivingly connected to the second counter-rotatable fan, the high pressure turbine having a row of high pressure turbine nozzle stator vanes axially located between the combustor and a row of high pressure turbine blades of the high pressure turbine, the row of high pressure turbine blades being counter-rotatable to the first low pressure turbine, a row of low pressure stator vanes between first and second rows of low pressure turbine blades of the first and second low pressure turbines respectively, and the row of high pressure turbine nozzle stator vanes, the row of high pressure turbine blades, the first row of low pressure turbine blades, the row of low pressure stator vanes, and the second row of low pressure turbine blades being in serial axial and downstream relationship.

46. An engine as claimed in claim 45 further comprising a second varying means for independently varying a flow area of the vane hub section.

47. An engine as claimed in claim 46 wherein the first and second varying means include independently varying vane tip sections and independently varying vane hub sections respectively.

48. An engine as claimed in claim 47 further comprising a front variable area bypass injector door in the first bypass inlet.

49. An engine as claimed in claim 48 further comprising the first and second varying means including:

an inner shaft attached to a pivotable trailing edge hub flap of the vane hub section, an outer shaft attached to a pivotable trailing edge tip flap of the vane tip section, the inner shaft coaxially disposed within an outer shaft of the fan stator vane, a first unison ring connected in actuating relationship to a first lever arm which is connected in rotatably actuating relationship to the inner shaft, and a second unison ring connected in actuating relationship to a second lever arm which is connected in rotatably actuating relationship to the outer shaft.

50. An engine as claimed in claim 45 wherein the row of low pressure stator vanes are variable.

51. An engine as claimed in claim 45 wherein the row of low pressure stator vanes are fixed.

52. A FLADE counter-rotating fan aircraft gas turbine engine comprising:

axially spaced-apart first and second counter-rotatable fans and at least one row of FLADE fan blades disposed radially outwardly of and drivingly connected to one of the first and second counter-rotatable fans, a second low pressure turbine drivingly connected to the first counter-rotatable fan and a first low pressure turbine drivingly connected to the second counter-rotatable fan, a core engine located downstream and axially aft of the first and second counter-rotatable fans, the core engine having in serial flow relationship a row of core driven fan stator vanes, a core driven fan with at least one row of core driven fan blades, a high pressure compressor, a combustor, and a high pressure turbine drivingly connected to the core driven fan, first and second counter-rotatable fans are radially disposed across an annular first fan duct, the core driven fan is radially disposed across an annular second fan duct, a vane shroud dividing the core driven fan stator vanes into radially inner and outer vane hub and tip sections, a fan shroud dividing the core driven fan blades into radially inner and outer blade hub and tip sections, a first bypass inlet to the fan bypass duct is disposed axially between the second counter-rotatable fan and the annular core engine inlet to the core engine, a fan tip duct across the vane tip sections of the core driven fan stator vanes and across the blade tip sections of the core driven fan blades extending to a second bypass inlet to the fan bypass duct, a first varying means for independently varying a flow area of the vane tip section, a plurality of circumferentially disposed hollow struts in fluid flow communication with the FIADE duct, a substantially hollow centerbody supported by and in fluid flow communication with the hollow struts, a variable area flade air nozzle including an axially translatable plug within the hollow centerbody and a radially outwardly positioned fixed nozzle cowling of the centerbody, the row of FLADE fan blades disposed radially outwardly of and drivingly connected to the second counter-rotatable fan, the high pressure turbine having a row of high pressure turbine nozzle stator vanes axially located between the combustor and a row of high pressure turbine blades of the high pressure turbine, the row of high pressure turbine blades being counter-rotatable to the first low pressure turbine, a row of variable low pressure stator vanes between first and second rows of low pressure turbine blades of the first and second low pressure turbines respectively, and the row of high pressure turbine nozzle stator vanes, the row of high pressure turbine blades, the first row of low pressure turbine blades, the row of variable low pressure stator vanes, and the second row of low pressure turbine blades being in serial axial and downstream relationship.

53. An engine as claimed in claim 52 further comprising a variable throat area engine nozzle downstream and axially aft of the counter-rotatable second low pressure turbine and the fan bypass duct.

54. An engine as claimed in claim 53 further comprising the variable throat area engine nozzle including an axially translatable radially outer annular convergent and divergent wall and a radially fixed and axially translatable annular inner wall on the centerbody.

55. An engine as claimed in claim 54 further comprising:

the variable throat area engine nozzle having an axially translatable radially outer annular convergent/divergent wall spaced radially outwardly apart from a radially fixed and axially translatable annular inner wall on the centerbody, the translatable radially outer annular convergent/divergent wall operable to control a throat area between the convergent/divergent wall and the radially fixed and axially translatable annular inner wall, and the translatable radially outer annular convergent/divergent wall operable to control a nozzle exit area of the engine nozzle.

\* \* \* \* \*